3,342,256
METHOD FOR RECOVERING OIL FROM SUBTERRANEAN FORMATIONS
George G. Bernard and Le Roy W. Holm, Crystal Lake, Ill., assignors, by mesne assignments, to Union Oil Company of California, Los Angeles, Calif., a corporation of California
No Drawing. Filed Apr. 17, 1964, Ser. No. 360,768
14 Claims. (Cl. 166—9)

This invention relates to recovery of petroleum from subterranean reservoirs. It is more specifically concerned with improving the efficiency of a secondary oil recovery process wherein carbon dioxide is used as a solvent.

Secondary recovery of petroleum by the injection of carbon dioxide into an input well and withdrawal of reservoir fluids from a producing well has long been known and practiced. Carbon dioxide has been used alone at high pressures wherein significant oil recoveries have been had. Such a process is described by Whorton et al. in U.S. Patent 2,623,596. It was later discovered in laboratory core experiments that the recovery of petroleum using carbon dioxide could be greatly increased if the carbon dioxide was used in slug form and driven through the reservoir by an aqueous drive fluid such as brine, plain or carbonated water. A typical process in which carbon dioxide is driven through the reservoir by an aqueous fluid is fully described in Holm, U.S. Patent 3,065,790.

Oil recoveries achieved in applying these methods in which carbon dioxide is used as a solvent in actual reservoirs were disappointing in that the total oil recovery fell far short of that anticipated in the inventions based on core experiments. It was found that while the processes succeeded in recovering practically all of the petroleum in the reservoir which was contacted by the injected carbon dioxide, large quantities of petroleum were still bypassed and left in the reservoir when the process was carried out. This unfortunate result has been related to the unfavorable mobility relationship between the reservoir fluids and injected fluids, which results in unsatisfactory areal sweep efficiencies and a corresponding low overall efficiency of the process. It is well known in the oil recovery art that an oil displacement process is most efficient when the viscosity of the displacing fluid is equal to or greater than the viscosity of the displaced oil. Since carbon dioxide is less viscous and more mobile than most crude oils, it is not a very efficient oil displacement agent.

It is an object of this invention to provide an improved carbon dioxide-waterflood secondary recovery process by which greater quantities of oil can be produced. Another object of this invention is to provide a carbon dioxide-waterflood secondary recovery process in which greatly enhanced areal sweep efficiencies are obtained. It is another object of this invention to more effectively utilize the carbon dioxide used in the carbon dioxide-waterflood secondary recovery process.

It has been found that the areal sweep efficiency and the overall efficiency of the carbon dioxide-waterflood secondary recovery process can be greatly improved by incorporating in the carbon dioxide a small amount of a foaming agent or surfactant. The amount of carbon dioxide needed to obtain high oil recoveries is also decreased, inasmuch as the presence of the surfactant causes the carbon dioxide to be confined to the zone of interest, and prohibits the carbon dioxide from channeling through high permeability strata and thereby becoming lost or unavailable for the purposes for which it was intended to be used. The surfactant or foaming agent can be introduced either in the carbon dioxide slug or directly into the reservoir by means of a water or mineral oil vehicle prior to injection of the carbon dioxide. The surfactant or foaming agent can be either oil soluble or water soluble, and should have sufficient foaming ability and stability to satisfactorily increase the viscosity of the carbon dioxide and to prevent the carbon dioxide from channeling through highly permeable fissures, cracks or strata. The surfactant may be incorporated in a solution containing liquefied and dissolved gases before the carbon dioxide is introduced into the reservoir, so the dissolved gases come out of solution when the injected solution reaches fissures or cracks, and generate foam and effectively plug these highly permeable channels, thereby preventing subsequently injected carbon dioxide from channeling through these cracks away from the reservoir zone to be treated. In other instances, the surfactant solution may be injected into the reservoir and followed by a small amount of gas which will cause foaming through a considerable portion of the reservoir.

It must be noted that the aforedescribed secondary recovery processes in which carbon dioxide is used as a solvent employ the carbon dioxide at pressures in excess of about 700 p.s.i. It is well known that the solubility characteristics of carbon dioxide have a distinct effect on oil recoveries when the carbon dioxide is at pressures in excess of about 700 p.s.i. At these high pressures, carbon dioxide exists as a dense fluid or liquid, rather than as a gas, even though the critical temperature of carbon dioxide is about 89° F. That is to say, carbon dioxide has not been liquefied at temperatures above 89° F., regardless of the pressures applied. However, below 89° F., carbon dioxide exists either as a gas, a dense fluid or a liquid, depending upon pressures applied. Inasmuch as the typical pressures employed in secondary oil recovery when carbon dioxide is used are in excess of 700 p.s.i., and the temperatures are below about 200° F., the carbon dioxide exists as a dense fluid, rather than as a gas, and, in most typical situations where the reservoir temperature is below 89° the carbon dioxide exists as a liquid. A dense fluid is more like a liquid than a gas, as evidenced by considering solubility factors. For instance, a surfactant or foaming agent will readily dissolve in carbon dioxide when the carbon dioxide exists as a dense fluid, whereas the surfactant will not dissolve in the carbon dioxide when the carbon dioxide exists in the gaseous state.

The amount of the carbon dioxide injected into the formation will of course vary for different formations, and will be dependent upon total reservoir pore volume, hydrocarbon pore volume, and other unique formation characteristics. However, throughout this description and claims the term "effective pore volume" is to be taken to mean that portion of the reservoir which is expected to be contacted by the carbon dioxide injected. "Effective pore volume" is determined by conventional laboratory and field techniques, well known to petroleum engineers.

In carrying out the process of this invention, about 0.01 to 0.2 effective pore volume of carbon dioxide, containing approximately 0.1 to 10 wt. percent of the foaming agent, is injected through an input well and into the formation. Depending upon the formation temperature and the pressure utilized, the carbon dioxide will exist either as a liquid or as a dense fluid. The carbon dioxide is preferably injected into the reservoir or formation as a liquid and under sufficient pressure to maintain it in the reservoir as either a dense fluid or a liquid. The subsequently injected drive medium may be water, brine or carbonated water sufficient in quantity to drive the carbon dioxide through the reservoir from the injection to a production well. Injection of the driving fluid is continued until the liquids produced in the production well have a high water/oil ratio, at which time injection of drive fluid is terminated. Subsequent to the termination of driving fluid injection, the formation is depressured to allow the dissolved gases to come out of solution and thereby to form foam or drive addition oil towards the production well.

In another embodiment of this process, the surfactant or foaming agent may be injected into the reservoir or formation prior to injection of the carbon dioxide slug. For instance, the surfactant may be incorporated into a liquid such as water, mineral oil, or those hydrocarbons which are normally liquid at pressures in excess of about 700 p.s.i., such as LPG, propane, etc. In this instance, since the water or hydrocarbon acts as a vehicle for the surfactant, it is necessary that the surfactant be soluble in the vehicle in which it is to be incorporated. Where the surfactant is incorporated in a liquefied light hydrocarbon and is introduced into the reservoir ahead of the carbon dioxide slug, the presence of cracks and fissures, etc., wherein very high pressure gradients exist, will cause the liquefied light hydrocarbon to flash to a gas thereby generating foam at these areas of very high permeability. When the surfactant is incorporated in a water vehicle, the water may contain carbon dioxide or other dissolved gases in amounts sufficient to cause them to come out of solution and generate foam when an area of low pressure is encountered. When the foaming agent is introduced into the reservoir prior to injection of the carbon dioxide slug, it is readily apparent that the subsequently injected carbon dioxide will not channel through highly permeable strata inasmuch as the foam will retard such channeling. Not only does formation of foam at the highly permeable strata, streaks or fissures retard loss of carbon dioxide from the zone of interest, but any foam increases its viscosity, thereby making the carbon dioxide a much more efficient displacing fluid. While the surfactant-containing solution may have incorporated in it dissolved gas which will come out of solution, it is also possible to inject an aqueous or non-aqueous surfactant-containing solution and follow it with gases such as carbon dioxide, methane, etc. When this mode is utilized, foam will be formed within the immediate vicinity of the injection well and will preferentially be driven into the more highly permeable strata rather than the less permeable strata, the solution taking the path of least resistance. The carbon dioxide then injected will more readily penetrate the less permeable strata because of the plugging effect created by the foam in the highly permeable strata.

The term "surfactant" or foaming agent as used in this specification and the appended claims denotes a surfactant or foaming agent which will have a tendency to generate foam in an underground reservoir or formation in the presence of a liquid and a gas. Additionally, the foam generated should have the ability to retard the passage of a fluid therethrough. Non-limiting examples of surfactants or foaming agents useful in this invention are those which when incorporated in a liquid such as liquid hydrocarbon or water in an amount not in excess of 5% by weight, meets the following described test. The surfactant is dissolved in a hydrocarbon or, alternatively, water (depending upon whether or not the surfactant is oil- or water-soluble), and 500 ml. of the solution is placed in a graduated cylinder to form a column having a height of 50 cm. Natural gas is passed into the bottom of the column through a fritted glass disc at substantially atmospheric pressure so that the gas bubbles through the column of liquid and passes out of the top of the cylinder. The gas rate is maintained at about 500 ml. of gas per minute per square inch of column cross-sectional area. The flow of gas is continued for a period of 15 minutes, at the end of which time the flow of gas is discontinued. A column of foam will then be found to exist at the top of the column of liquid hydrocarbon or water. The foaming agent or surfactant should desirably, but not necessarily, be capable of producing a column of foam not less than 180 cm. in height under the conditions aforedescribed.

With some surfactants or foaming agents, the aforedescribed test requirements will be met by incorporating quantities of surfactant far less than 5% by weight in the test medium such as hydrocarbon or aqueous solution. Thus, where it is found that 2% by weight of a given surfactant is capable of meeting the requirements of the aforedefined test, it is preferred, for reasons of economy, that this amount be used. The use of excessive quantities of surfactant or foaming agents should be avoided for reasons of economy and to prevent the production of an excessively thick and viscous foam bank which might require the use of costly high injection pressures. The use of various commercial high-foaming surfactants or foaming agents is contemplated, an example of a satisfactory oil-soluble foaming agent being a 1:1 mixture of dicoco dimethylammonium chloride and decyl trimethyl ammonium chloride. This mixture can be used in the amount of about 2% by weight with excellent results. An example of a water-soluble surfactant or foaming agent is polyoxyethylated octylphenol, known commercially under the tradename "Triton X–100." Other examples of suitable foam-producing agents include dimethyl didodecenyl ammonium chloride, methyl trioctenyl ammonium iodide, trimethyl decenyl ammonium chloride, dibutyl dihexadecenyl ammonium chloride, and water-soluble salts of esters of $C_3$–$C_6$ sulfo dicarboxylic acids having the general formula

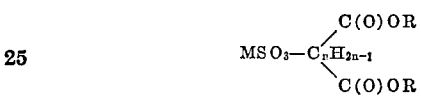

where M is a substituent forming a water-soluble salt, such as alkali metals, ammonium, and substituted ammonium, R is $C_3$–$C_{16}$ alkyl substituent, and $n$ is an integer from 1–4, e.g., monosodium dioctyl sulfosuccinate, ammonium dilaurylsulfosuccinate, monosodium dibutyl sebacate, monosodium diamyl sulfoadipate, and others; and water-soluble perfluoroalkanoic acids and salts having 3–24 carbon atoms per molecule, e.g., perfluorooctanoic acid, perfluoropropanoic acid, perfluorononanoic acid. Other surfactive agents which may be used in the practice of this invention are:

| Trade Name | Chemical Name |
|---|---|
| Aerosol C–61 | Ethanolated alkyl guanidine-amine complex. |
| Aerosol OS | Isopropyl naphthalene sodium sulfonate. |
| Aerosol OT | Dioctyl sodium sulfosuccinate. |
| Arquad 2C | Dicoco dimethyl ammonium chloride. |
| Arquad T | Tallow trimethyl ammonium chloride. |
| Duponol EP | Fatty alcohol alkylolamine sulfate. |
| Duponol RA | Modified ether alcohol sulfate sodium salt. |
| Duponol WAQ | Sodium lauryl alcohol sulfate. |
| Ethomid HT–60 | Condensation of hydrogenated tallow amide and ethylene oxide. |
| Hyonic FA–75 | Modified fatty alkylolamide. |
| Miranol HM Concentrate. | Ethylene cyclomido 1-lauryl, 2-hydroxy ethylene Na alcoholate, methylene Na carboxylate. |
| Miranol MM Concentrate. | Same as Miranol HM except myristyl group is substituted for lauryl group. |
| Nacconal NR | Alkyl aryl sulfonate. |
| Ninol AA62 | Lauric diethanolamide. |
| Ninol 1001 | Fatty acid alkanolamide. |
| Petrowet R | Sodium alkyl sulfonate |
| Pluronic L44 | Condensation product of ethylene oxide with propylene glycol. |
| Product BCO | C-cetyl betaine. |
| Renex 650 | Polyoxyethylene alkyl aryl ether. |
| Sorbit AC | Sodium alkyl napthalene sulfonate. |
| Sulfanole FAF | Sodium salt of fatty alcohols, sulfated. |
| Triton AS–30 | Sodium lauryl sulfate. |
| Triton X–100 | Alkyl aryl polyether alcohol. |

| Trade Name | Chemical Name |
|---|---|
| Span 20 | Sorbitan Monolaurate. |
| Span 40 | Sorbitan Monopalmitate. |
| Span 85 | Sorbitan Trioleate. |
| Tween 65 | Polyoxyethylene Sorbitan Tristearate. |
| Tween 81 | Polyoxyethylene Sorbitan Monooleate. |
| OPE 1 | Octylphenoxyethanols. |
| OPE 2 | Octylphenoxyethanols. |
| OPE 3 | Octylphenoxyethanols. |
| Triton GR-7 | Dioctyl Sodium Sulfosuccinate. |
| Triton B-1956 | Modified Phthalic Glycerol Alkyl Resin. |
| Triton X-45 | Isooctyl phenyl polyethoxy ethanol (about 5 ethoxy groups per molecule). |

As a specific example of one of the embodiments of this invention, a petroleum-containing reservoir having a temperature of 80° F. is subjected to secondary recovery by injecting through an input well 0.05% effective pore volume of carbon dioxide containing 1.0% by weight of "Triton X-100". The reservoir pressure is 1000 p.s.i. sufficient to maintain the carbon dioxide in the liquid state. Carbonated water is then injected at a rate of 2000 gallons per day at a pressure of 1200 p.s.i., sufficient to maintain the carbon dioxide in solution and to drive the carbon dioxide slug toward producing wells which surround the injection well. Petroleum is produced in the producing wells until the water/oil ratio reaches 25. At this point the injection of aqueous driving fluid is terminated and production continued under conditions of pressure depletion.

While in the preferred embodiment the surfactant is incorporated in an amount of about 1% by weight of the liquid carbon dioxide slug, it may also be introduced into the reservoir prior to the injection of the carbon dioxide slug. In such an instance the surfactant solution will preferably contain dissolved gases so that the gases will come out of solution and generate foam in areas of high permeability, thereby decreasing the amount of carbon dioxide needed for effective oil recovery. When the surfactant is incorporated in a liquid hydrocarbon, the amount of liquid hydrocarbon in which the surfactant is placed should be not less than about 0.01 effective pore volume, and ordinarily will be about 0.05 to 0.2 effective pore volume. The amount of surfactant will normally comprise about 0.1 to 10 wt. percent of the vehicle.

From the foregoing description, it is apparent that we have discovered a method whereby carbon dioxide is used in a secondary recovery process more effectively and in lesser amounts. The use of the surfactants not only increases the viscosity of the carbon dioxide slug, thereby making the carbon dioxide a more effective displacing fluid, but also prevents the loss of carbon dioxide from the zone of interest due to faults, fractures and highly permeable strata.

The embodiments of this invention in which an exclusive property or privilege is claimed are defined as follows:

1. In the recovery of oil from subterranean oil-bearing formations wherein carbon dioxide is introduced into the formation and then driven through said formation from an injection well to a recovery well by means of an aqueous drive liquid, the improvement which comprises disposing a surfactant solution, capable of forming a stable foam under formation conditions, in said formation not later than the introduction of said carbon dioxide, and prior to the driving of said carbon dioxide by means of said aqueous drive liquid.

2. The method in accordance with claim 1 wherein said solution comprises a surfactant, dissolved gas and a liquid in which said surfactant is soluble.

3. The method in accordance with claim 2 wherein said gas is selected from the group consisting of ethane, propane and carbon dioxide.

4. The method in accordance with claim 3 wherein said liquid is selected from the group consisting of mineral oil and water.

5. The method in accordance with claim 4 wherein the quantity of surfactant-containing solution is about 0.01 to 0.20 effective pore volume and said surfactant comprises about 0.1 to 10 wt. percent of said solution.

6. The method in accordance with claim 1 wherein the formation temperature and pressure maintains said carbon dioxide in the non-gaseous state.

7. In the recovery of oil from subterranean oil-bearing formations wherein a slug of non-gaseous carbon dioxide is driven through the reservoir from an injection well to a recovery well by means of an aqueous liquid, the improvement which comprises incorporating a surfactant capable of forming a stable foam under formation conditions in said carbon dioxide in an amount at least 0.1% by weight of said carbon dioxide.

8. The method of recovering petroleum from an underground oil-bearing formation, having a temperature and pressure suitable to maintain carbon dioxide in non-gaseous form and penetrated by at least one injection well and one production well, comprising injecting into said injection well and into said formation 0.01 to 0.20 effective pore volume of carbon dioxide, having incorporated therein at least 0.1% by weight of a foaming agent, then injecting an aqueous liquid to drive said injected carbon dioxide toward said producing well, and recovering petroleum therefrom.

9. The method in accordance with claim 8 wherein the aqueous drive liquid is selected from the group consisting of water, brine and carbonated water.

10. The method of recovering petroleum from an underground oil-bearing formation, having a temperature and pressure suitable to maintain carbon dioxide in non-gaseous form and penetrated by at least one injection well and one production well, comprising injecting into said injection well and into said formation about 0.01 to 0.20 effective pore volume of a surfactant-containing solution, thereafter injecting 0.01 to 0.20 effective pore volume of carbon dioxide followed by an aqueous liquid whereby said carbon dioxide is driven toward and producing well, and recovering petroleum therefrom.

11. The method in accordance with claim 10 wherein said surfactant-containing solution comprises dissolved gas, liquid and a surfactant soluble in said liquid.

12. The method in accordance with claim 11 wherein said gas is selected from the group consisting of ethane, propane and carbon dioxide.

13. The method in accordance with claim 12 wherein said liquid is selected from the group consisting of mineral oil and water.

14. The method in accordance with claim 10 wherein the aqueous drive liquid is selected from the group consisting of water, brine and carbonated water.

References Cited

UNITED STATES PATENTS

| | | | |
|---|---|---|---|
| 2,875,831 | 3/1959 | Martin et al. | 166—9 |
| 3,065,790 | 11/1962 | Holm | 166—7 X |
| 3,082,822 | 3/1963 | Holm et al. | 166—9 |
| 3,084,743 | 4/1963 | West et al. | 166—9 |
| 3,096,821 | 7/1963 | Dyes | 166—9 |
| 3,177,939 | 4/1965 | Holm et al. | 166—9 |
| 3,196,944 | 7/1965 | Bernard et al. | 166—9 |
| 3,207,217 | 9/1965 | Woertz | 166—9 |

ERNEST R. PURSER, Primary Examiner.

CHARLES E. O'CONNELL, STEPHEN J. NOVOSAD, Examiners.